NUMBERS ON CIRCLES ARE APPARENT DIP IN DEGREES
NUMBERS ON RADIAL LINES ARE APPARENT AZIMUTH
OF DIP RELATIVE TO No. 1 ARM $\frac{2-1}{D} = 0.2''$
$\frac{3-1}{D} = 0.41''$

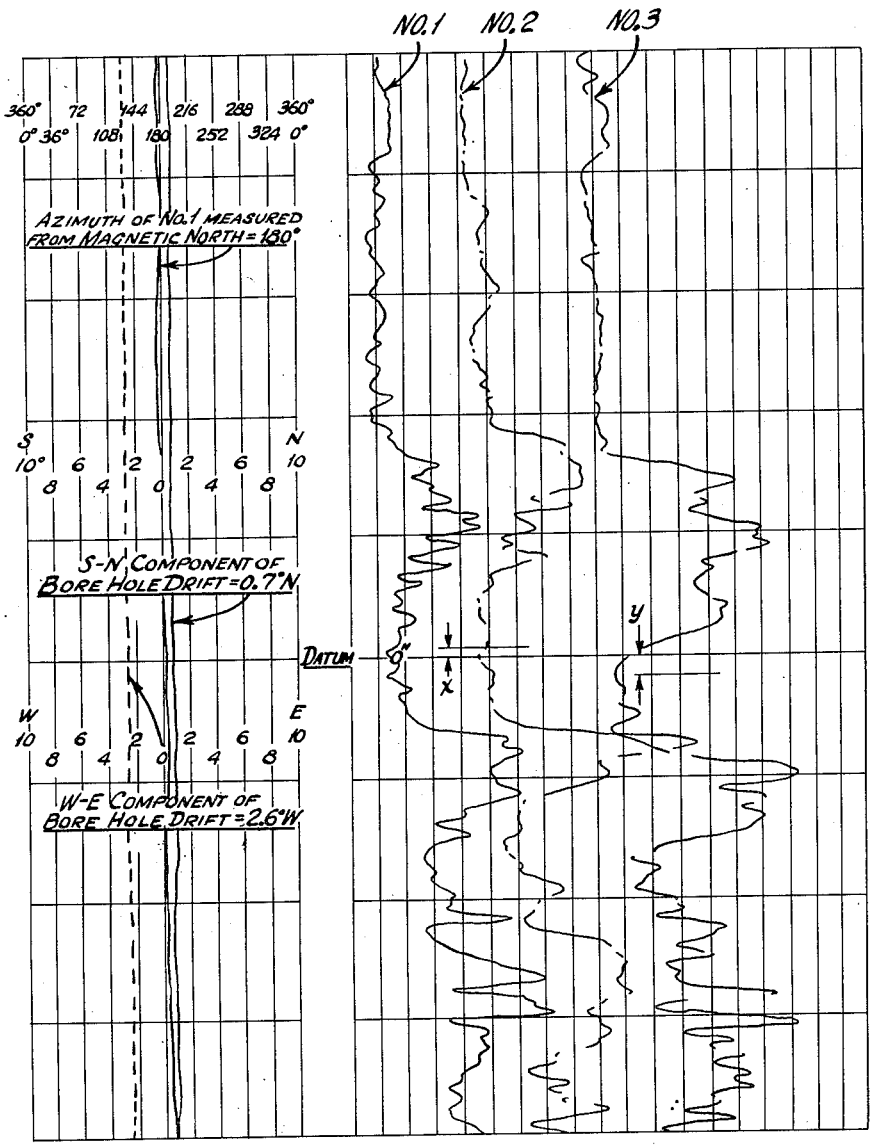

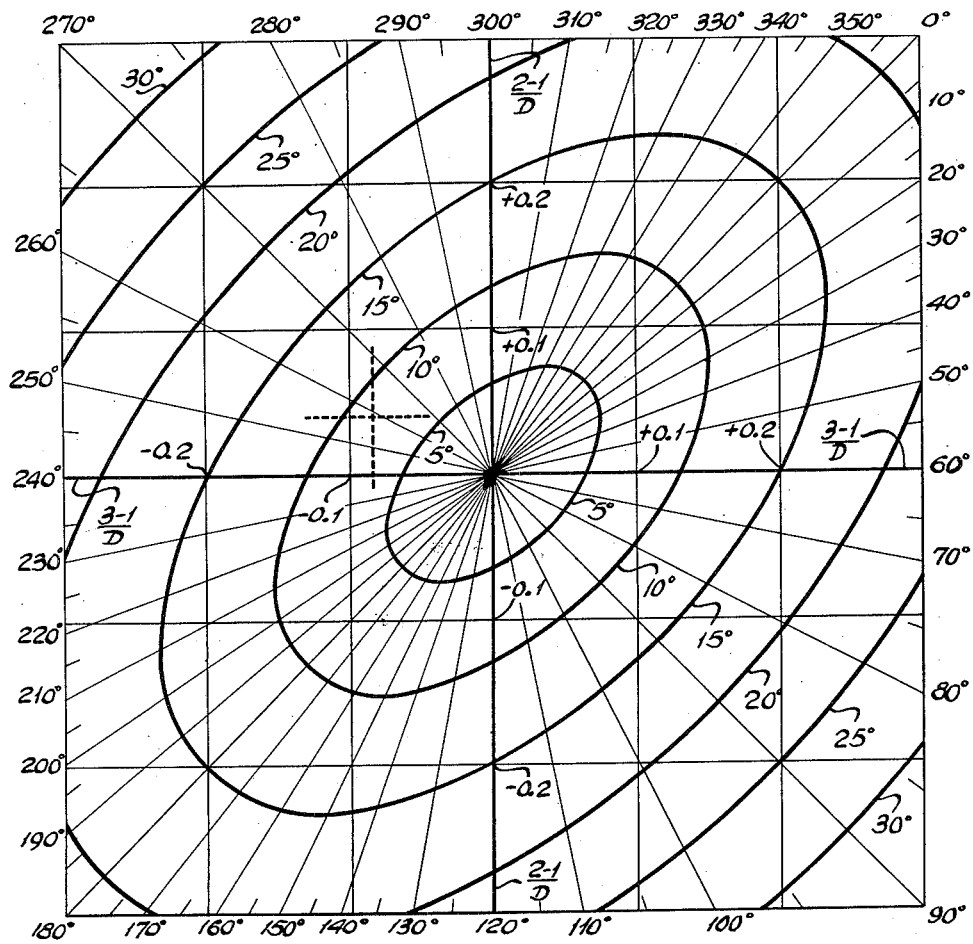

APPARENT DIP = 35½°
APPARENT AZIMUTH = 258°

United States Patent Office 2,973,472
Patented Feb. 28, 1961

2,973,472

GRAPHICAL METHODS FOR THE INTERPRETATION OF DIPMETER LOGS

Edmond F. Egan, New Orleans, La., Thomas L. Kister, Houston, Tex., and Merrill B. Scott, Chicago, Ill., assignors to Texaco Inc., a corporation of Delaware Filed Oct. 6, 1954, Ser. No. 460,674

4 Claims. (Cl. 324—1)

This invention relates generally to continuous dipmeter logging of wells or bore holes and more particularly to graphical methods for determining the direction and magnitude of dip of the formations crossed by a bore hole.

Logging instruments are available to obtain data from which the angle and the direction of the dip of subsurface formations may be estimated. The elevations of three significant test points in the bore hole on the plane of a dipping formation, spaced 120° from each other in relation to a plane perpendicular to the vertical axis of the measuring instrument, are needed. Data from such instruments also provide orientation from magnetic north, and also the angle and direction of the bore hole drift. Prior art methods of determining strike and dip require at least three wells, if meaningful results are to be obtained. A dipmeter log could furnish the same information from one well survey and, especially where well control is sparse, is of great aid in regional contouring, promotes stratigraphic studies, e.g. the solution of unconformity, pinchout, and bed thickness problems, and may make possible the correct location of an offset well.

While the interpretation of continuous dipmeter logs is not difficult, it is exacting and tedious and requires a relatively expensive instrument, which furnishes a physical reconstruction of the geometrical elements of the bore hole as a model to convert log data into dip angle and direction.

In the operation of one system of dipmeter logging, the differences in bore hole diameters are utilized, which differences are visualized as similar to the erosion of surface outcrops. The more competent rocks stands out as ledges protruding into the bore hole while the less competent rocks are eroded. If the formation dips, one side of a particular ledge will be higher than the other. Apparatus for this system of dipmeter logging is disclosed in U.S. Patent No. 2,640,275. Three caliper arms are spaced equiangularly about a plane at right angles to the instrument axis, with each arm producing a trace on the log of the bore hole radius versus depth, analogous to the electric log traces of standard non-continuous dipmeter logging systems. Correlating the traces establishes the relative position of the three points in the bore hole, thereby defining the dipping plane.

To ascertain dip direction, the orientation of the arms must be known. With the position of the three arms fixed at 120° from each other and if the well bore is vertical, the true dip angle and direction can be found, knowing the position of the #1 arm, which is oriented (the other two arms being referred to as #2 and #3 in a clockwise direction) and the three points on the dipping plane. If the well bore is not vertical, the dip is only apparent and must be corrected to obtain true dip, by finding the angle and direction of the bore hole drift, apparatus for which is disclosed in U.S. Patent No. 2,614,334 (as well as in Fig. 11 of U.S. Patent No. 2,640,275).

By methods well known in the art, orientation traces are obtained. Combination of the bore radius versus depth traces, together with the orientation and drift traces, gives the data which determine the true dip angle and direction.

In another prior art system of dipmeter logging, such as disclosed in U.S. Patent No. 2,669,690, differences in resistivities (or self potentials) of different strata in the bore hole are involved, with 3 micrologs run simultaneously from contact pads set 120° apart in a plane normal to the vertical axis of the measuring instrument. A spring system for the microlog pads operates as a unit so each pad has the same bore hole radius. In large well bores that are out-of-round, or in very steeply inclined holes, one pad may not make good contact with the side of the well bore thereby producing a trace or curve reading mud resistivity only and resulting in sections of the log being useless for dipmeter purposes. Each microlog curve fixes one point on the bedding surface and the position of the surface can be determined by the displacement between corresponding points on the curves. As in the first noted prior art system, the orientation of a base (or #1) microlog pad and the bore hole drift should be known, the latter obtained by use of a teleclinometer, which gives three traces for the orientation of the base pad and the E–W and N–S components of the bore hole drift, respectively.

Both types of logs from the prior art systems can be interpreted in the same general manner. Vertical displacements between traces can be picked from either the caliper arm or microlog pad traces, while the direction of either the #1 arm or #1 pad is obtained from the orientation traces. This data, with the addition of hole size information can be translated into apparent dip angle and direction. If the well bore is not vertical, the angle and direction of well bore drift are obtained from the orientation traces and used to arrive at the true values.

Accordingly, it is an object of the present invention to provide a simple, accurate and time-saving method of interpretation of a dipmeter log.

It is another object of the present invention to provide an improved method of determining the dip and strike of subsurface strata traversed in well logging.

A further object of invention is to provide an improved method of dipmeter logging interpretation which does not require the use of expensive prior art mechanical means.

Still another object of invention is to provide an improved method of dipmeter logging interpretation by which accurate subsurface mapping is attained expeditiously and with the least error.

These and other objects of invention will be apparent from the following description, taken in conjunction with the drawings, in which:

Fig. 2 is a typical log obtained with the use of the apparatus disclosed in Fig. 1b;

Fig. 3 is an illustration of a graphical solution of the apparent dip and apparent azimuth of dip relative to the base microlog pad using the data from Fig. 2;

Fig. 5 is an illustration of a graphical solution applicable for use with apparatus having measuring elements of either equal or unequal radii and preferably for use with the apparatus disclosed in Fig. 1a;

It has been found that the same general graphical methods of translating dipmeter log data into true dip and strike can be used for interpreting the results of the prior art dipmeter logging instruments and that the graphical solutions furnish a permanent record which is subject to confirmation for accuracy.

For a better understanding of the invention, reference is made to the drawings.

Figure 1B:
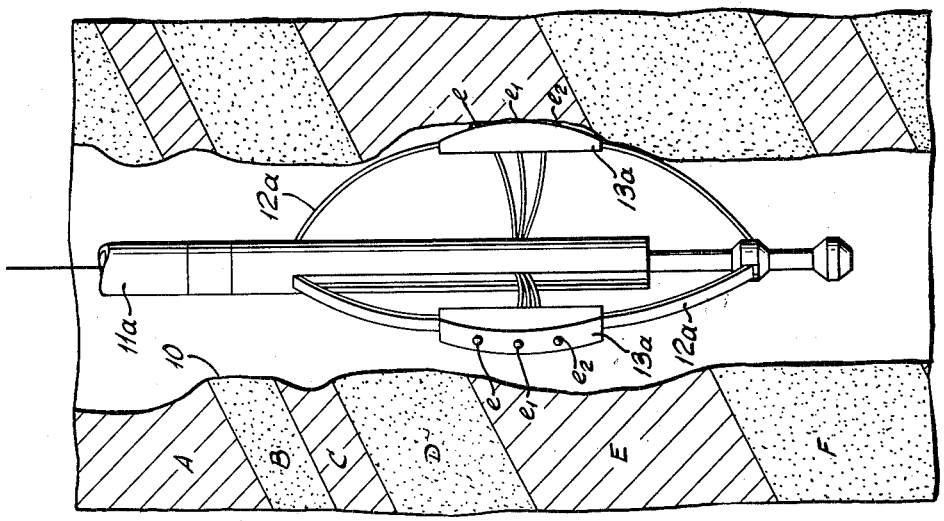
Fig. 1b is a similar schematic showing of part of the apparatus employed in a dipmeter logging system using microlog pads.
Figure 1A:
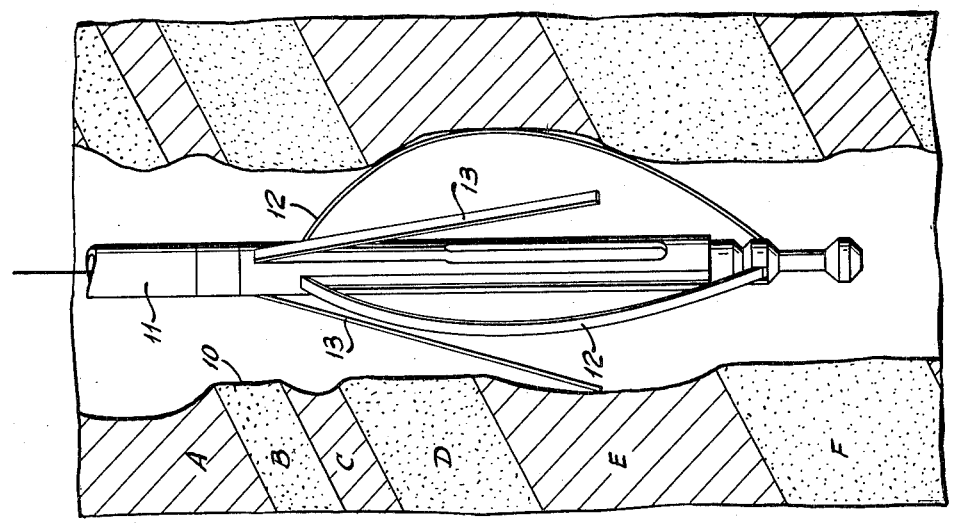
Fig. 1a is a schematic showing of part of the apparatus employed in a dipmeter logging system using caliper arms.

The diagrammatic showing in Fig. 1a indicates a well or bore hole at 10, cutting across various strata indicated at A, B, C, D, E, and F. A part of one form of a typical dipmeter logging instrument is indicated at 11, with conventional bore centering devices at 12, and caliper arms at 13, contacting the wall of the bore hole and, as the instrument is drawn upwardly, touching each specific strata at different times during its ascent. As in conventional electric logging, contacts are made and a log of the various bore hole characteristics versus depth traces is recorded, as disclosed in the previously noted Patent No. 2,640,275.

Similarly, in Fig. 1b, a part of another prior art instrument for dipmeter logging is disclosed at 11a, located in a bore hole 10 which traverses strata A to F inclusive, and wherein the bowed springs 12a, each support an insulating cushion member indicated at 13a, in which are seated a plurality of electrodes, $e$, $e_1$ and $e_2$, by means of which the electric resistivities or the self potentials of the various strata, crossed in the passage of the instrument 11a, are traced on the log, as disclosed in the above cited Patent No. 2,669,690. Because of the bowed construction of the springs 12a, they follow the contour of the bore hole, so that its size can be recorded also.

A typical dipmeter log sheet, obtained from the use of part of the instrument depicted diagrammatically in Fig. 1b, and from which the apparent dip and its direction is interpreted, is disclosed in Fig. 2. Accuracy of dipmeter interpretation depends largely upon the interpreter's skill in making correlations, and a knowledge of the subsurface geology.

For accuracy, exact picking of points and measurement of distances is required. The technique of correlating traces and picking points to find vertical displacements can be likened to the art of correlating standard electric logs. This selection of points which define the dipping plane, is probably the most important part of the interpretation. A single pick point should generally be looked upon as doubtful as it may represent cross bedding which does not conform to true dip. Specific resistivity, self potential or hole size values cannot be used as pick points; the shape and character of the curves must be relied upon. The geometry effects of standard electric logging also hold true for the microlog traces. The smaller features usually give better points than the larger broader features.

In the interpretation of such a typical log, the uphole direction is considered as positive and the downhole direction as negative. Usually, the No. 1 curve is used as the reference and by giving it a zero relative displacement, several steps are saved in ascertaining the dip. When numerous pick points are available and the No. 1 arm or pad does not vary appreciably in azimuth, accuracy may be improved by averaging. A strict mathematical average has the disadvantage in that poor points are included, so that a visual average is probably the most accurate. This is obtained by measuring points to a datum line on the No. 1 curve (see Fig. 2, for example), and then using the same distances from the correlative points on curves No. 2 and No. 3, with dividers efficiently replacing a scale in this operation. This visual method minimizes the chances of missing actual changes of dip.

Another method of interpretation is to overlay individual traces obtained either by reproducing parts of the log or splitting the log to correlate and average the curves. Still another method is to trace the No. 1 curve on transparent paper and mark through the paper and the log with a pin at the point chosen for the datum. The tracing is then placed over the other curves, correlated, and a pin used to mark the log through the pin hole in the tracing paper. Measurements then are made on the log from the datum to the pinpoints. Fig. 2 is a good typical log and as disclosed, the displacements measured on the log represent $\frac{1}{20}$ of the displacements in the well bore. If the orientation of the No. 1 arm or pad varies considerably in a short section, it makes a pick in that section less reliable. The averaging techniques would be in error in most cases so that each set of correlation points should be converted into dip individually.

The relative displacement of the traces, the orientation of the No. 1 arm or pad, the orientation of the bore hole and the hole diameter are the data required to determine true dip. If the dip direction from true north is required instead of from magnetic north, declination must be known.

In the prior art, mechanical computers are used for translating log data into dip angle and direction. These computers are actually models of the conditions existing in the bore hole. They simulate arm radius, vertical displacement and the plane of the formation so that a capable operator can visualize the subsurface attitude of the formation. Though the computers are simple to use, care must be taken not to make a 180° direction error. The mechanical computers are usually limited to dips of less than 50°. In general, experienced operators can re-compute dip angles within 1° and dip direction within 10°.

The applicants have developed several methods to replace the models used in the prior art. The methods have certain advantages in enabling the desired results to be obtained from the traces by the simple and quick procedural steps of drawing lines on a combination of complementary charts, thereby obviating the necessity for an expensive model with its attendant rather complicated manipulation and high potential factor of directional error of 180°.

Figure 4:
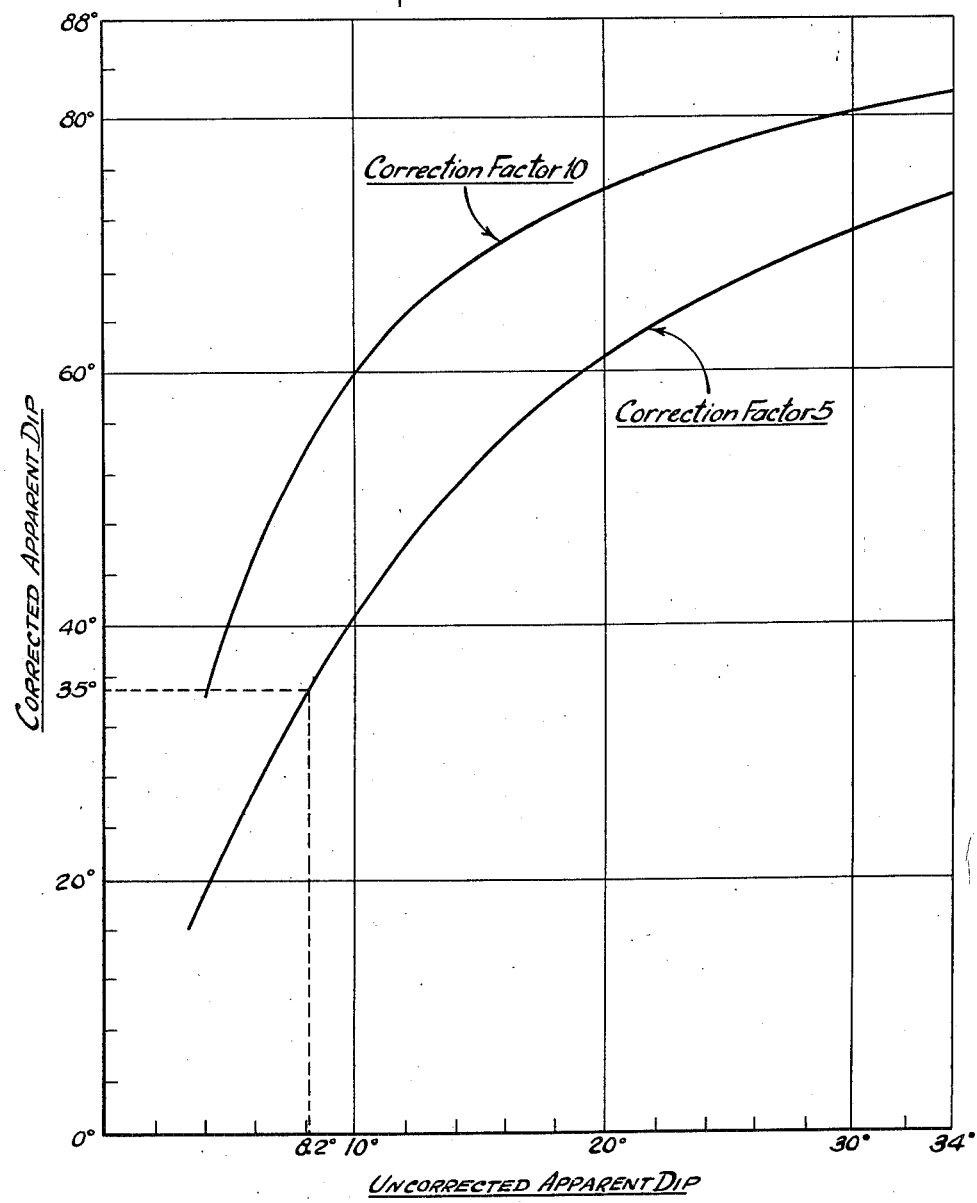
Fig. 4 is an illustration of a graphical solution for obtaining the corrected value of the apparent dip obtained from Fig. 3.

In the graphic method developed by the applicants for obtaining the apparent dip and apparent azimuth relative to No. 1 arm, Figs. 3 and 4 are used to convert trace correlation numbers, the legends on the figures being considered self-explanatory. If the ratios of the trace displacement of the No. 2 arm from the No. 1 arm (2—1) divided by the bore hole diameter (D) and the trace displacement of the No. 3 arm from the No. 1 arm (3—1) divided by the bore hole diameter (D) are both less than 0.3, the information desired can be obtained from Fig. 3 directly. If either ratio is larger than 0.3 but less than 1.5, it is necessary to divide the ratios $$\left(\frac{2-1}{D}, \frac{3-1}{D}\right)$$

by 5 and enter at Fig. 3. If either ratio is larger than 1.5, it is necessary to divide by 10 to enter Fig. 3. The apparent direction of dip found on Fig. 3 by any of these methods is the correct value of apparent dip relative to the No. 1 arm. If it was necessary to divide the ratios by 5 or 10, the value found on Fig. 3 is an uncorrected value of apparent dip angle and serves as the abscissa entry on Fig. 4. The corrected value of apparent dip is found on the ordinate of Fig. 4.

The problem based on data from Fig. 2 will be worked out using this graphic method. The trace displacements shown in Fig. 2 are 2—1 (or $x$)=2.0 inches and 3−1 (or y) = −4.1 inches. Using a 10 inch bore hole gives ratios of $$\frac{2-1}{D}=0.20 \text{ and } \frac{3-1}{D}=-0.41$$

Since one ratio is larger than 0.3 but less than 1.5, both ratios are divided by 5 giving values for entry on Fig. 3 of 0.04 and −0.082, respectively. The apparent azimuth of dip relative to the No. 1 arm is found to be 258°. The uncorrected apparent dip is found to be 8.2°, which value is used as the abscissa of Fig. 4. Inasmuch as the ratios have been divided by 5, it is necessary to use the "Correction Factor 5" curve to get the corrected value of 35° for the apparent dip on the ordinate.

Figure 5:
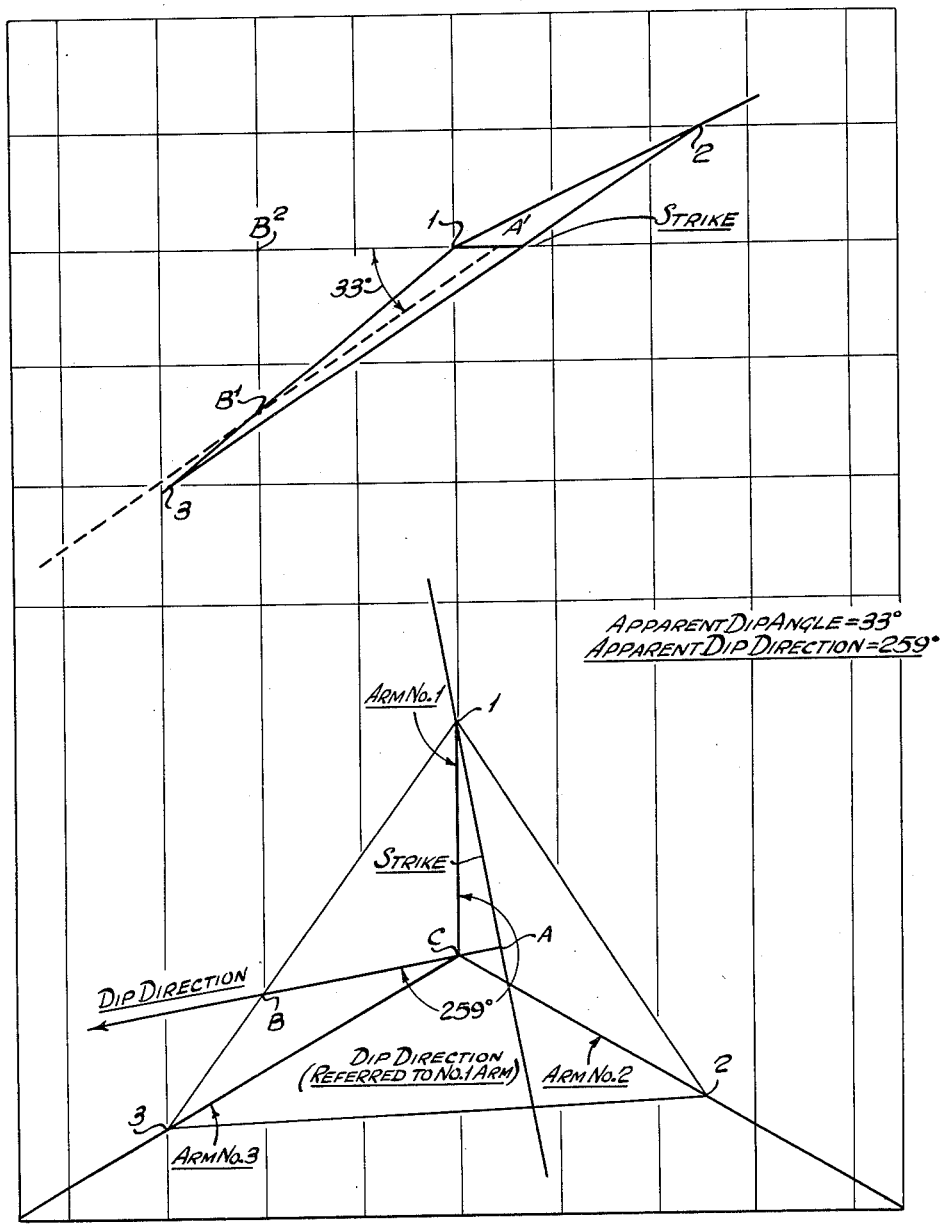

Figs. 3 and 4, through accurate for equal radii tools, do not always apply to unequal radii tools, but the descriptive geometry method disclosed in Fig. 5 can be applied to both equal and unequal radii tools and is recommended for use with the apparatus disclosed in Fig. 1a.

Using Fig. 5, radii of 4, 5 and 6 inches are assumed for the No. 1, 2 and 3 arms and are pointed off along each arm spaced 120° apart and their end points are connected to form the lower triangle. The arms are positioned so that in the projection from plan to elevation, the No. 1 arm will emerge as a point. The vertices of the lower triangle are projected vertically into the upper view and the displacements of arms No. 1 (0″), No. 2 (+2.0″) and No. 3 (−4.1″) from a datum are pointed off and the points are connected to form the upper triangle. The strike line is obtained by drawing a horizontal line from a vertex in the upper triangle so as to intersect the opposite side, as disclosed passing through the vertex at 1. This strike line is then projected down into the lower triangle. A line drawn perpendicular to the strike line in the lower triangle and passing through the center at C indicates the direction of dip relative to the No. 1 arm (259°) as toward the low side of the triangle along this line.

In the lower triangle, starting from A (the intersection of the strike line and the direction of the dip line) proceed along the direction of dip line, through C and continue until the side of the lower triangle is reached, as indicated at B. This point B is then projected into the upper triangle to point B₁ and the projection is continued to B₂ on the continuation of the strike line, along which the distance AB from the lower triangle is stepped off, as indicated at A₁B₂. The acute angle at A₁ and opposite side B₁B₂ is the apparent angle of dip (33°).

Figure 6:
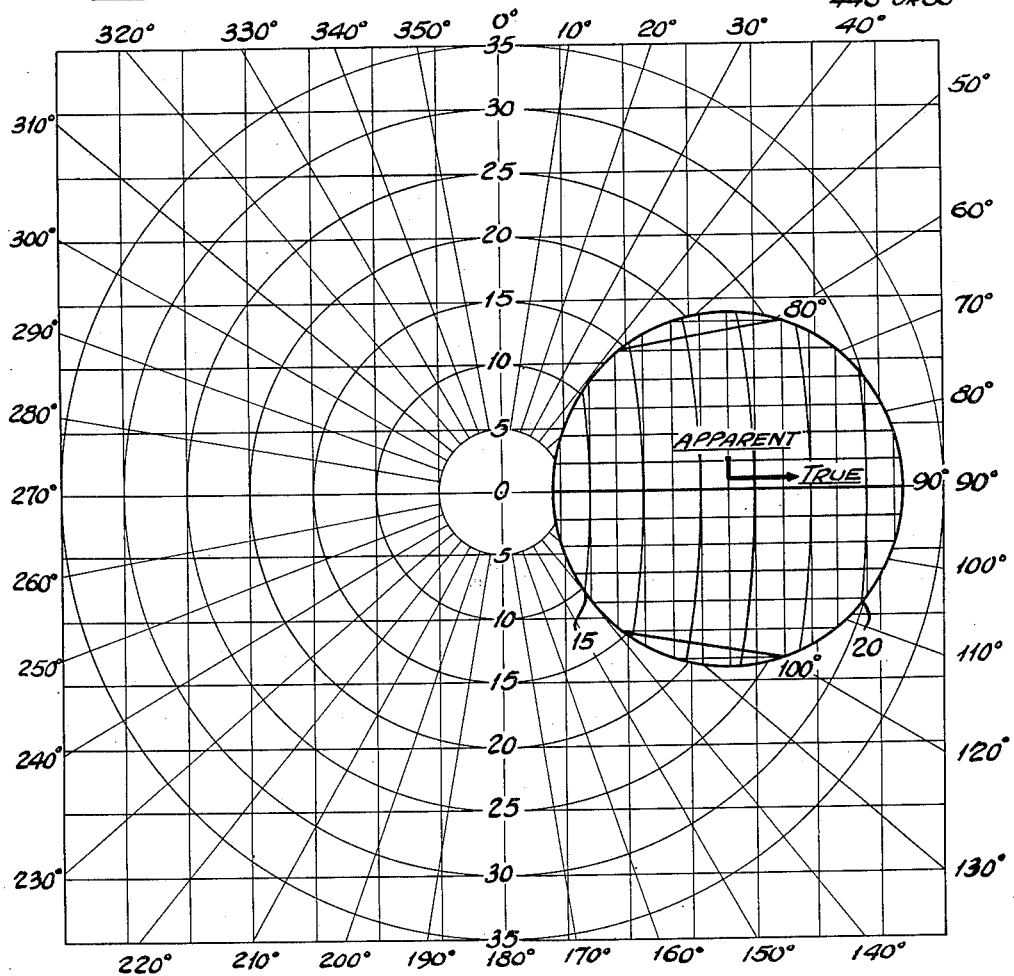
Fig. 6 is an illustration of a graphical solution for correcting the apparent dip and azimuth found by either of the disclosed methods of Figs. 3 and 5.

To correct the apparent dip and azimuth values found by use of the graphical or descriptive geometry methods, the polar chart of Fig. 6 is used. The azimuth of the No. 1 arm and magnetic declination (if east) are added to the apparent dip azimuth in both cases of the above mentioned methods prior to entry in Fig. 6. In both mentioned prior art systems of dipmeter logging, the drift of the bore hole is measured, which is the direction of the bottom of the hole from magnetic north. The bore hole drift is applied by first adding magnetic declination (10° E) and the No. 1 pad azimuth (180°— from the left hand side of the chart of Fig. 2) to the apparent dip and dip azimuth (35° at 258°—from Figs. 3 and 4) which is then plotted on Fig. 6 as 35° at 88°. From this point, the components of the bore hole drift are stepped off in reverse direction as vectors i.e. SN. (0.7° N.) and WE. (2.6° W.). The resultant point obtained (37½° at 89°) is the true dip angle and azimuth.

In the former of the mentioned prior art logging systems, the bore hole drift is applied in the same manner as above. As the drift is given in angle and azimuth, the vectors can be assumed to be combined. The vector sum is plotted in a reverse direction from the apparent dip and azimuth point.

Figure 7:
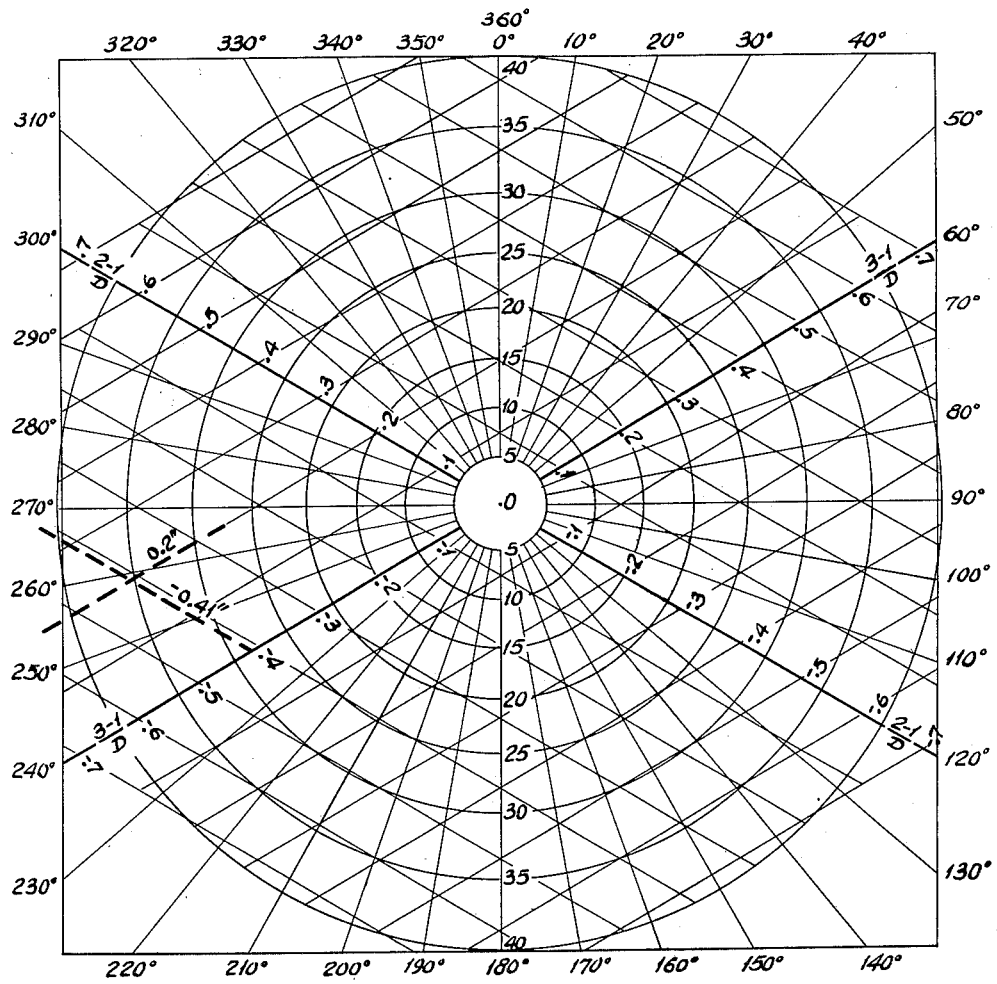
Fig. 7 is another illustration of a graphical solution of the apparent dip and apparent azimuth of dip relative to the base microlog pad using the data from Fig. 2, similar to the illustration of Fig. 3.

Fig. 7 is an illustration of a graphical solution corresponding to that using Fig. 3 alone, the use of Fig. 4 being unnecessary in this instance. Figs. 3 and 7 are conformal transformations of each other; in Fig. 7, because of the mathematical relationships of the several variables, viz. the ratios of the relative displacements of the traces to the diameter of the bore hole $$\left(\frac{2-1}{D}, \frac{3-1}{D}\right)$$

(designated by Cartesian coordinates), and the apparent angle of dip and apparent azimuth of dip (designated by polar coordinates), the apparent angle of dip is measured nonlinearly along radii (r) and the apparent azimuth of dip is measured by vectorial angles (θ), and the coordinate axes for the location of the ratios of the relative displacements of the traces from the three equally spaced measuring elements are oblique straight lines intersecting at the origin of a polar diagram at an angle of 120° to each other, i.e. starting from the vertical position and moving a radius in a clockwise direction, the 2−1/D axis would have a vectorial angle of 120° and extend along the 120°–300° radii and the 3−1/D axis would have a vectorial angle of 240° and extend along the 240°–60° radii; in Fig. 3, these axes would still extend along the same radii but since the axes are represented in rectangular form now, the vectorial angles representing the apparent azimuth of dip would be unequally spaced and the loci of the angles of dip would be changed to concentric ellipses from concentric circles, both loci having uniformly increasing spacings from the polar axis. In other words, in the chart of Fig. 7, the abscissae and ordinates for the trace displacement ratios are plotted along oblique axes (i.e. distorted when compared to normal usage of rectangular coordinates) and the polar coordinates of radius and vectorial angle for measuring the apparent dip and apparent azimuth of dip located by such plotting are read on a nonlinear polar chart representation; in Fig. 3, the trace displacement ratios are plotted along rectangular axes and the polar coordinate chart is distorted, for now in the first and third quadrants, where normally 90° is indicated, 120° are "compressed" uniformly, while in the second and fourth quadrants, the supplements thereto of 60° are now "expanded" uniformly, causing the concentric circular representations of the loci of the apparent angles of dip in Fig. 7 with normal vectorial angles to change in form to elliptical representations of the loci and variable spacings of vectorial angles from a distorted polar chart representation. Dependent upon conditions, either form of chart may be chosen for use. However, because of the greater detail available, the elliptical representation is preferred for use, together with the correction chart of Fig. 4.

The values of the original ratios of the trace displacements used in Fig. 3 entered directly on Fig. 7 will give apparent dip and apparent azimuth of dip values of 35½° at 258° respectively, which correspond closely to the values obtained by using Figs. 3 and 4 (35° at 258°). The values obtained from the use of Fig. 7 are corrected for bore hole drift using the polar chart of Fig. 6 to get the true values of dip and azimuth.

Fig. 7, covering the range of apparent dip from 0 to 40 degrees, is to be used for medium dips, while other similar charts are scaled for more detail in the case of dips below 20°, and for use above 40° dip. The ranges of Fig. 3 may be changed similarly, but it is not required because the correction factor chart of Fig. 4 used therewith will give the same results.

Even though the specification emphasizes the electrical logging of the prior art, the methods disclosed herein are applicable to the interpretation of the basic data which may be obtained by any kind of logging method, so long as the method is capable of recognizing differences in the nature or contour of the face of the well bore. Correspondingly, the measuring device may be lowered as well as raised so long as a satisfactory log is obtainable.

Thus, it can be seen that dip and azimuth values can be recomputed or that similar values for various additional levels can be computed for correlation purposes or additional knowledge.

Obviously many other modifications and variations of the invention as set forth above may be made without departing from the spirit and scope thereof, and therefore only such limitations should be imposed as are indicated in the appended claims.

We claim:

1. In the dip meter logging of a well bore wherein representative traces coordinated with depth are obtained, including (1) three traces of characteristics of the formation surrounding the well bore at three points spaced 120° apart in the same plane normal to the bore hole axis, (2) a trace of the orientation of one of said points termed the datum point, and (3) a trace of the bore hole inclination at said datum point, and wherein correlative points from the three traces obtained in (1) above are selected and the correlated points are compared to determine the values of $X/D$ and $Y/D$, where X is the vertical displacement of a correlated point on the second of said three traces from a datum line for said datum point on the first trace, Y is the vertical displacement of a correlated point of the third of said three traces from said datum line, and D is the bore hole diameter, the method of rapidly and easily obtaining the values of the true dip and the true azimuth of dip of a subsurface strata traversed by said well bore by physical manipulation without the use of a mechanical model and without complicated calculations, which comprises plotting the values of $X/D$ and $Y/D$ on the coordinate axes of a first chart which is a graphic chart having abscissae and ordinates depicted as intersecting at an angle selected from the group consisting of 90° and 120° and representing respectively increments of value of $X/D$ and $Y/D$, said graphic chart also containing lines radiating from the origin thereof and representing increments in degrees of the apparent azimuth of dip of said strata relative to said datum point, and also a series of concentric closed lines about said origin in the form of a geometrical figure selected from the group consisting of ellipses and circles and representing increments in degrees of the apparent dip of said strata, drawing parallel to said coordinate axes intersecting lines from the plotted values of $X/D$ and $Y/D$ on said first chart to obtain at the intersection point directly from said first chart without calculations the values in degrees of the apparent dip of said strata and the apparent azimuth of dip of said strata with reference to said datum point, transferring said values for the apparent dip and the apparent azimuth of dip (which latter may be corrected for the value of the azimuth of said datum point from the orientation trace of (2) above) to a second chart which is a polar chart having abscissae and ordinates representing units of bore hole drift to determine a point thereon, said polar chart having a series of concentric circles about the origin thereof representing increments of values in degrees of the dip of the strata, and also lines radiating from said origin representing increments of values in degrees of azimuth of dip of the strata, drawing connected vertical and horizontal lines from the thus determined point on said second chart to apply corrections for the bore hole drift (from the bore hole inclination trace of (3) above), and thereby obtaining directly from the point of termination of said connected lines on said second chart values of true dip and true azimuth of dip of said strata.

2. In the dip meter logging of a well bore, wherein representative traces coordinated with depth are obtained, including (1) three traces of characteristics of the formation surrounding the well bore at three points spaced 120° apart in substantially the same plane normal to the bore hole axis, (2) a trace of the orientation of one of said points termed the datum point, and (3) a trace of the bore hole inclination at said datum point, and wherein correlative points from said three traces obtained in (1) above are selected and the correlated points compared to determine the values of $X/D$ and $Y/D$, where X is the vertical displacement of a correlated point on the second of said three traces from a datum line for said datum point on the first trace, Y is the vertical displacement of a correlated point on the third of said three traces from said datum line, and D is the bore hole diameter, the method of rapidly and easily obtaining the values of the true dip and the true azimuth of dip of a subsurface strata traversed by said well bore by physical manipulation without the use of a mechanical model and without complicated calculations, which comprises plotting the values of $X/D$ and $Y/D$ on the coordinate axes of a first chart which is a graphic chart having abscissae and ordinates axes intersecting at 90° but depicting coordinate axes intersecting at 120°, with the abscissae and ordinates representing respectively increments of value of $X/D$ and $Y/D$, said graphic chart also containing lines radiating from the origin thereof based on the coordinate axes intersecting at 120° and representing increments in degrees of the apparent azimuth of dip of said strata relative to said datum point, and also a series of concentric ellipses about said origin and representing increments in degrees of the apparent dip of said strata, said concentric ellipses being converted to concentric circles when the radiating lines depict uniform angles, drawing parallel to said coordinate axes intersecting lines from said plotted values of $X/D$ and $Y/D$ on said graphic chart to obtain at the intersection point directly from said chart without calculations the values in degrees of the apparent dip of said strata and the apparent azimuth of dip of said strata with reference to said datum point, transferring said values of the apparent dip and apparent azimuth of dip (which latter may be corrected for the azimuth of said datum point from the orientation trace of (2) above) to a second chart which is a polar chart having abscissae and ordinates representing units of bore hole drift to determine a point thereon, said polar chart having a series of concentric circles about the center thereof representing increments of values in degrees of the dip of the strata, and also radial lines radiating from said center representing increments of values in degrees of azimuth of dip of the strata, drawing connected lines parallel to said coordinate axes from the thus determined point on said second chart to apply corrections for the bore hole drift (from the bore hole inclination trace of (3) above), and thereby obtaining directly from the point of termination of said connected lines on said second chart values of true dip and true azimuth of dip of said strata.

3. The method according to claim 2, particularly applicable to the determination of larger apparent dip values, which comprises first dividing the actual values of $X/D$ and $Y/D$ by a whole number of at least 5, plotting the divided values on said first graphic chart and determining the apparent azimuth of dip value and an uncorrected apparent dip value from said first graphic chart, transferring said uncorrected apparent dip value from said first graphic chart to a third chart which is a correction chart having abscissae and ordinates representing respectively values in degrees of uncorrected apparent dip and corrected apparent dip and also having a curved line which is a correction factor for said whole number used, drawing lines parallel to the ordinate axis intersecting on the curved correction factor line and from the point of intersection thereon parallel to the abscissa axis and thereby obtaining directly from the intersection therewith on said correction chart the corrected apparent dip value which is then transferred to said second chart.

4. In the dip meter logging of a well bore, wherein representative traces coordinated with depth are obtained, including (1) three traces of characteristics of the formation surrounding the well bore at three points spaced 120° apart in the same plane normal to the bore hole axis, (2) a trace of the orientation of one of said points termed the datum point, and (3) a trace of the bore hole inclination at said datum point, and wherein correlative points from said three traces obtained in (1) above are selected and the correlated points compared to determine the values of $X/D$ and $Y/D$, where X is the vertical displacement of a corrected point on the second of said three traces from a datum line for said datum point on the first trace, Y is the vertical displacement of a correlated point on the third of said three traces from said datum line, and D is the bore hole diameter, the method of rapidly and easily obtaining the values of the true dip and the true azimuth of dip of a subsurface strata traversed by said well bore by physical manipulation without the use of a mechanical model and without complicated calculations, which comprises plotting the values of $X/D$ and $Y/D$ on the coordinate axes of a first chart which is a graphic chart having abscissae and ordinates axes intersecting at 120° for the representation respectively of increments of value of $X/D$ and $Y/D$, said graphic chart also containing radial line radiating from the center depicting equal angles and representing increments in degrees of the apparent azimuth of dip of said strata relative to said datum point, and also a series of concentric circles about said center representing increments in degrees of the apparent dip of said strata, drawing parallel to said coordinate axes intersecting lines from said plotted values of $X/D$ and $Y/D$ on said graphic chart to obtain at the intersection point directly from said chart without calculations the values in degrees of the apparent dip of said strata and the apparent azimuth of dip of said strata with reference to said datum point, transferring said values of the apparent dip and the apparent azimuth of dip (which latter may be corrected for the azimuth of said datum point from the orientation trace of (2) above and for the magnetic declination) to a second chart which is a polar chart having abscissae and ordinates representing respectively units of bore hole drift to determine a point thereon, said polar chart having a series of concentric circles about the center thereof representing increments of values in degrees of the dip of the strata, and also radial lines radiating from said center representing increments of values in degrees of azimuth of dip of the strata, drawing parallel to the coordinate axes of said second chart connected lines from the thus determined point on said second chart to apply corrections for the bore hole drift (from the bore hole inclination trace of (3) above), and thereby obtaining directly from the point of termination of said connected lines on said second chart values of true dip and true azimuth of dip of the said strata.

No references cited.